United States Patent
Zhao et al.

(10) Patent No.: US 10,637,784 B2
(45) Date of Patent: Apr. 28, 2020

(54) EQUATION-BASED RATE CONTROL USING NETWORK DELAY FOR VARIABLE BITRATE SCENARIOS

(71) Applicant: Microsoft Technology Licensing, LLC, Redmond, WA (US)

(72) Inventors: Weidong Zhao, Bellevue, WA (US); Sanjeev Mehrotra, Redmond, WA (US); Jayashree Sadagopan, Bellevue, WA (US); Costin Hagiu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/417,494

(22) Filed: May 20, 2019

(65) Prior Publication Data

US 2019/0273689 A1 Sep. 5, 2019

Related U.S. Application Data

(63) Continuation of application No. 15/375,994, filed on Dec. 12, 2016, now Pat. No. 10,341,240.

(51) Int. Cl.
*H04L 12/851* (2013.01)
*H04L 12/927* (2013.01)
*H04L 12/923* (2013.01)

(52) U.S. Cl.
CPC ............ *H04L 47/24* (2013.01); *H04L 47/762* (2013.01); *H04L 47/805* (2013.01)

(58) Field of Classification Search
CPC ...... H04L 47/24; H04L 47/762; H04L 47/805
See application file for complete search history.

(56) References Cited

U.S. PATENT DOCUMENTS

| | | | |
|---|---|---|---|
| 2009/0164657 A1* | 6/2009 | Li | H04L 41/0896 709/233 |
| 2013/0128735 A1* | 5/2013 | Li | H04L 47/25 370/230 |
| 2017/0195231 A1* | 7/2017 | Lopez Serrano | H04L 47/11 |

OTHER PUBLICATIONS

URCP: Universal Rate Control Protocol for Real-Time Communication Applications; Di Xie et al., Microsoft Research; pp. 6-9; Jun. 2013.*

* cited by examiner

*Primary Examiner* — Jackie Zuniga Abad
(74) *Attorney, Agent, or Firm* — Klarquist Sparkman LLP

(57) ABSTRACT

Technologies are described for performing equation-based rate control using delay. For example, an observed network data rate and a network delay can be obtained for a network communication. A target network data rate can be calculated using the observed network data rate and the network delay. The target network data rate is calculated using an equation-based approach. For example, the equation-based rate control can set the target network data rate to a value that is directly proportional to the observed network data rate and inversely related to the network delay. The target network data rate is used to set the bitrate for the network communication.

20 Claims, 5 Drawing Sheets

SOFTWARE 580 IMPLEMENTING DESCRIBED TECHNOLOGIES

EQUATION-BASED RATE CONTROL USING NETWORK DELAY FOR VARIABLE BITRATE SCENARIOS

CROSS-REFERENCE TO RELATED APPLICATION

This application is a continuation of U.S. patent application Ser. No. 15/375,994, filed on Dec. 12, 2016, which is incorporated herein by reference.

BACKGROUND

Networks such as the Internet support a wide range of applications and corresponding network traffic flows. Different applications may have different requirements in terms of network throughput and delay. For example, interactive applications may require network traffic flows with low delay. In contrast, streaming applications may operate satisfactorily with relatively higher delay, but may require relatively higher throughput.

In order to accommodate the different network traffic needs of these applications, different rate control schemes have been developed. With delay-based protocols, the bandwidth is managed so that delay is low. While delay-based protocols can operate efficiently in some networking environments, problems can occur when the actual bitrate generated by the applications varies significantly over a short period of time. For example, in such situations oscillations can occur that disrupt the network traffic flow.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are provided for performing equation-based rate control using delay. For example, an observed network data rate and a network delay can be obtained for a network communication (e.g., for a remote desktop application). A target network data rate can be calculated using the observed network data rate and the network delay. The target network data rate is calculated using an equation-based approach. For example, the equation-based rate control can set the target network data rate to a value that is directly proportional to the observed network data rate and inversely related to the network delay. The target network data rate is used to set the bitrate for the network communication (e.g., provided to data sources to use in adjusting their bitrates).

DETAILED DESCRIPTION

Overview

Figure 1:
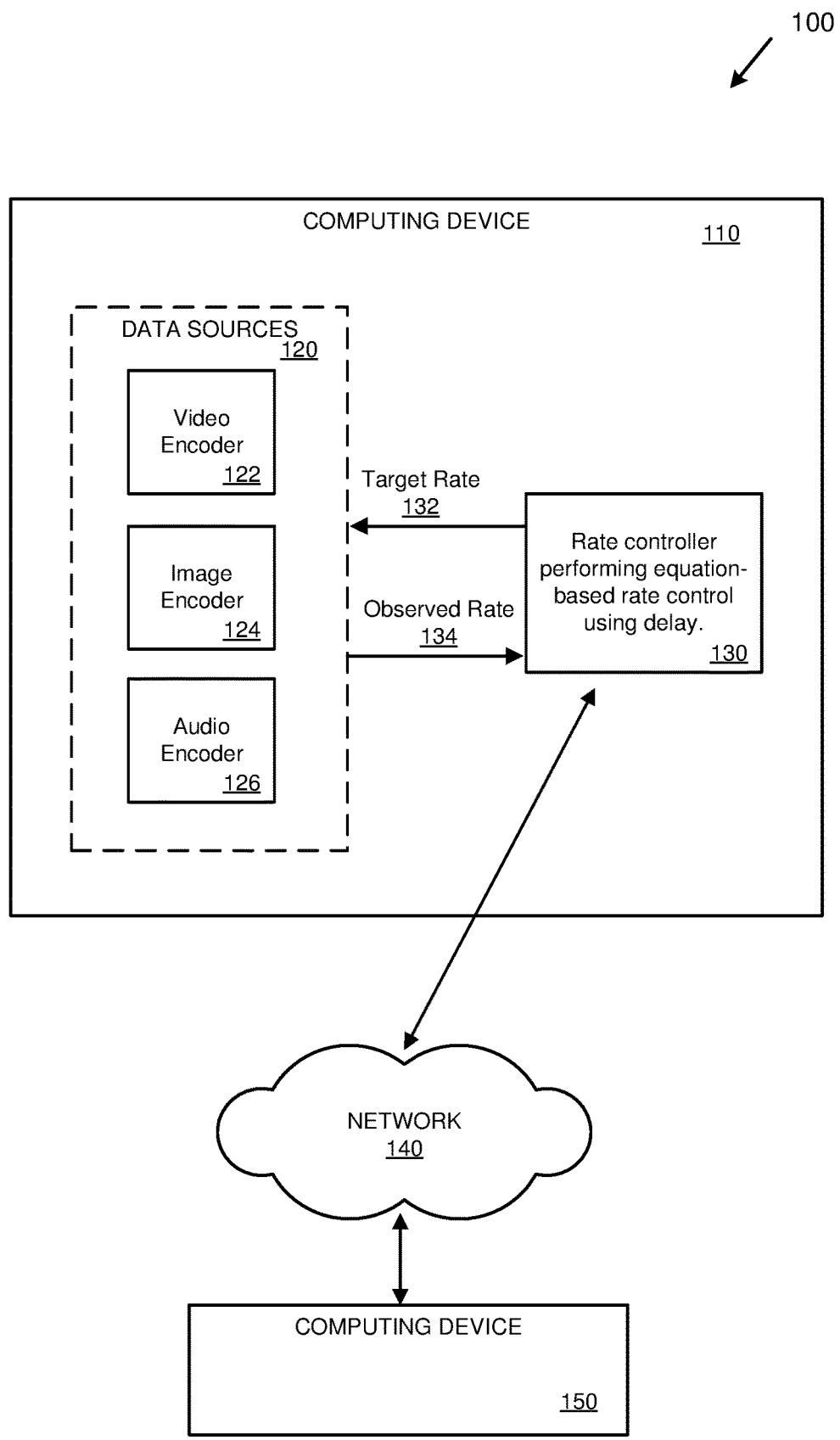
FIG. 1 is a diagram depicting an example environment for performing equation-based rate control using delay.

As described herein, various technologies are provided performing equation-based rate control using delay. For example, an observed network data rate and a network delay can be obtained for a network communication (e.g., for a remote desktop application). A target network data rate can be calculated using the observed network data rate and the network delay. The target network data rate is calculated using an equation-based approach. For example, the equation-based rate control can set the target network data rate to a value that is directly proportional to the observed network data rate and inversely related to the network delay. The target network data rate is used to set the bitrate for the network communication (e.g., provided to data sources to use in adjusting their bitrates).

The Universal Rate Control Protocol (URCP) is a low delay rate control protocol designed for real time communication applications. An example of the type of applications needing real-time communication are remote desktop applications where a client displays a graphical desktop of a remote server. A specific example remote desktop application operates using the Remote Desktop Protocol (RDP). Remote desktop applications benefit from low delay due to the real-time interaction that occurs when a client is manipulating a desktop served from a remote device. For example, the desktop content may change smoothly (e.g., due to displayed video or animation content) or abruptly (e.g., due to the user launching a new application within the desktop which causes the entire desktop display to change).

In the technologies described herein, URCP is used as a starting point for use with low-delay applications, such as in remote desktop scenarios. However, there are a number of issues that need to be addressed for URCP to work efficiently. Therefore, modifications are provided to the original URCP to address these issues.

In the description of the technologies herein, RDP is used as an example real-time (or near real-time) protocol that needs low delay to operate effectively. However, the technologies can be applied to other remote desktop protocols, and more generally to other applications that need to communicate with low delay. For example, the technologies described herein can be applied to perform equation-based rate control for applications in which the actual bitrate used varies significantly over time.

Original URCP

In the original URCP design, the low-delay effect is achieved by using queueing delay as the operational signal to adjust the transmission rate at the source device. More specifically, for every packet received, URCP uses the following equations (Equation 1 and Equation 2) to update the rate change (ΔR) in relation to the delay.

$$\Delta R = K_2(K_0 - R*\text{Delay})*\Delta t \qquad \text{(Equation 1)}$$

$$R = \min(R + \Delta R, R_{max}) \qquad \text{(Equation 2)}$$

Where R is the rate, $K_0$ and $K_2$ are functions of averaged R and averaged delay, both of which change slowly over time, and $\Delta t$ is the time since the last update. The value of $K_0$ defines an operating point which can be approached as the equation reaches equilibrium.

$$R = K_0/\text{Delay} \qquad \text{(Equation 3)}$$

Separating Target Bitrate from Advertised Bitrate

In the technologies described herein, issues with the original version of URCP are addressed using new solutions that can be applied to extend URCP. The new solutions can also be applied to other delay-based protocols.

One problem the original version of URCP presents when applied to RDP scenarios is that with RDP the rate R advertised by the rate controller to the data source (e.g., a video encoder or another type of data source) may not be the same as the rate produced by the data source. In fact, the difference in the advertised rate (also called the target rate or target bitrate) and the actual rate (also called the observed rate or observed bitrate) can be very large. For example, in a remote desktop scenario in which there are no changes to the desktop content, there is little to no traffic generated regardless of the value of R that is advertised. As a result, if the actual traffic rate is low (even though the advertised traffic rate is high), then the delay becomes very small because the network delay is only caused by the actual bit rate produced rather than the advertised rate. This will cause Equation 1 to become inaccurate. In order to address this issue, the advertised rate is separated from the actual rate.

The separated rates are defined as follows. The target rate (also called the target network data rate), labeled $R_t$, is the target bitrate advertised by URCP. The actual observed rate (also called the observed network data rate) generated by the data source is labeled $R_{ob}$. It can be assumed that the data source will not produce a rate higher than the advertised rate.

$$R_t \geq R_{ob} \quad \text{(Equation 4)}$$

Applying the separated $R_t$ and $R_{ob}$, Equation 1 is rewritten as follows.

$$\Delta R_t = K_2(K_0 - R_{ob}*\text{Delay})*\Delta t \quad \text{(Equation 5)}$$

Delay is a measure of the network delay (e.g., one-way-delay, queueing delay, round-trip-time, and/or another measure of network delay).

It may appear that the right hand side of Equation 5 only depends on $R_{ob}$, but not on $R_t$, which might raise a concern that the adjustment of $R_t$ from the left would not be reflected on the right after iteration, causing the convergence to fail. However it should be understood that $R_{ob}$ and $R_t$ are implicitly related by way of the data source. Specifically, for a scenario with full utilization of the bitrate (e.g., video encoding), $R_{ob}$ and $R_t$ are roughly the same, and Equation 5 behaves similar to Equation 1 (original URCP). However, for a scenario with less than full utilization of the bitrate (e.g., encoding at varying bitrates, remote desktop applications, etc.), then $R_{ob}$ is typically less than $R_t$ and equilibrium will not be reached because $R_t$ will keep increasing until capped at $R_{max}$ (due to Equation 2). This is acceptable because the data source cannot fully use $R_t$ anyway. This also allows the data source to quickly increase the actual data rate when content requires full bitrate utilization again.

One potential problem with Equation 5 is that it generates additive updates, which could make the selection of $K_2$ a delicate issue as it needs to accommodate a wide range of network data rates at which to update the rate through Equation 5. If $K_2$ is chosen to be too small, the updates become too slow, and if $K_2$ is chosen to be too large, significant oscillations can occur.

Equation 6 is a modified version of Equation 5 that provides improved stability and faster convergence. With Equation 6, $R_t$ is set directly to the equilibrium point (e.g., the equilibrium point that would eventually be reached using Equation 5).

$$R_t = K_0/\text{Delay} \quad \text{(Equation 6)}$$

$$K_0 = \sqrt{R_{max}} * \sqrt{R_{obRec}} * \text{Delay}_{min} \quad \text{(Equation 7)}$$

In Equation 7, $R_{obRec}$ is the actual bit rate based on the received acknowledgement (ACK) packets from the network data flow. In other words, network queueing is used as a low-pass filter for $R_{ob}$ to obtain a smoothed version of $R_{ob}$. In some implementations, $R_{obRec}$ is calculated by averaging network delay of received ACK packets over a time window.

Unlike Equation 5, which calculates a delta to the target bitrate, Equation 6 calculates the target bitrate directly. In this way, Equation 6 directly sets the target bitrate to the delay-based equilibrium point, without performing the incremental updates as used by Equation 5.

In some implementations, the target bitrate is directly proportional to the observed rate and inversely related to the network delay. Setting the target bitrate to be directly proportional to the observed rate can be accomplished using $R_{ob}$ (e.g., as reported by the data source) and/or using $R_{obRec}$ which is based on ACK packets. Setting the target bitrate to be inversely related to the network delay can be accomplished by measuring the queueing delay or another measure of network delay.

Equation 6 also exhibits fair sharing among multiple URCP network traffic flows. For example, consider two URCP flows that operate according to Equation 6 and that share the same path through the queue of a router. If the two flows start with a ratio of rates of 2-to-1, by combining the right hand side of Equation 6 with Equation 7 an updated target rate is obtained as follows.

$$\frac{R_{t1}}{R_{t2}} \sim \sqrt{\frac{R_{ob1}}{R_{ob2}}} = 1.414$$

Because the two flows share the same delay, and assuming their data sources have the same efficiency in converting $R_t$ to $R_{ob}$, they will rapidly reach convergence and fairly share the available bandwidth.

Using Estimated Delay

In some implementations, an estimated delay value is used as the operational signal to control the rate instead of a measured delay value. Using estimated delay can result in improved performance by allowing faster reaction to quickly changing bitrates and network conditions.

The delay used in Equation 6 is generally obtained by measuring the actual packets sent from the sender to the receiver (e.g., to determine one-way delay, round-trip-time, queueing delay, or some other measure of actual delay of the network packets). This can cause a problem in some situations, such as in the case of a sudden increase or decrease in rate. This could happen when the network condition changes suddenly or another flow is injected into the network. In these situations, because it can take some time for changes in the measured delay to have an effect on the target rate $R_t$ due to Equation 6, a substantial number of packets can be accumulated in the network queue. The packets accumulated in the network queue may cause additional queueing delay as they need to be processed and sent and are not affected by the adjustment to the rate (which will affect future packets being generated by the data source). As a result, in these situations the target rate $R_t$ is likely to exhibit an oscillation behavior, which in turn will introduce more delay.

In order to address this potential issue, in some implementations an estimated delay is used instead of the measured delay that would otherwise be used (e.g., in Equation 6) as the operational signal. In some implementations, the estimated delay is defined according to Equation 8.

$$D_{est} = \frac{\text{number of bytes in flight}}{R_{obRec}} \quad \text{(Equation 8)}$$

Where $D_{est}$ is the estimated delay, number of bytes in flight is the number of bytes of the network packets in transit (which is also controlled by the window size), and $R_{obRec}$ is the actual bit rate based on the received ACKs.

When in steady state where $R_{obRec}$ doesn't change, $D_{est}$ is approximately equal to the measured rate as it represents the amount of time a new byte takes to travel through the network queue. Even in the case where $R_{obRec}$ is changing, the difference between the two should not prevent $D_{est}$ to be used as an operational signal for rate control purposes.

Because the number of bytes in flight depends on receiving ACK signals back to the sender indicating reception of the packet, $D_{est}$ also includes the inherent delay in both directions. Therefore, an adjustment can be applied to obtain a more accurate estimate of queueing delay.

$$D_{est} = \frac{\text{number of bytes in flight}}{R_{obRec} - RTT_{min}} \quad \text{(Equation 9)}$$

When multiple URCP flows are present, the definition of $D_{est}$ in Equation 9 still exhibits universality in that the flows all share the same $D_{est}$. Therefore, fair sharing between multiple URCP flows still applies when using Equation 9.

When a network packet is added to the wire, an up-to-date estimated delay value can be obtained (e.g., a $D_{est}$ value obtained via Equation 9) without going through the network queue. Therefore, using the estimated delay eliminates the delayed response in the measured packet delay.

Example Environments Supporting Equation-Based Rate Control Using Delay

In the technologies described herein, environments comprising computing devices and networks can support network traffic flows that operate according to equation-based rate control using delay. The computing devices can include server computers, desktop computers, laptops, tablets, set-top devices, gaming consoles, smart phones, and other types of computing devices. In some implementations, computing devices operate in a server-client relationship in which the server generates data for transmitting to the client device (e.g., supporting a remote desktop application, an online gaming application, a video streaming application, etc.).

FIG. 1 is a diagram depicting an example environment 100 for performing equation-based rate control using delay. In the example environment 100, two computing devices are communicating via a network 140 (e.g., the Internet or another type of packet-switched data network). Specifically, a first computing device 110 is generating a network data flow via one or more data sources for sending to the second computing device 150 via the network 140.

Depicted at the first computing device 110 are three example data sources 120, a video encoder 122, an image encoder 124, and an audio encoder 126. Depending on the application or service being provided, more data sources, fewer data sources, and/or different data sources may be used. As an example, a remote desktop application may use a data source generating images of a desktop environment (and in some situations, video and/or audio may be generated if the desktop environment is playing video and/or audio content).

The data sources 120 output data that for transmission to the second computing device 150 in network packets (e.g., transmission control protocol (TCP) network packets, user datagram protocol (UDP) network packets, and/or network packets sent using another network protocol) via the network 140. The rate that the data sources 120 output data for transmission is controlled by the target rate 132. The target rate 132 sets a target bitrate for the data output by the data sources 120 (e.g., an overall target rate that is shared if there are multiple data sources). However, in some situations the data sources 120 can output data at a rate significantly below the target rate 132. For example, the data output by some applications can vary significantly over time (e.g., with a remote desktop application, the screen content may be static for a period of time resulting in little or no data being transmitted).

In the example environment 100, a rate controller 130 (e.g., implemented in software and/or hardware of the first computing device 110) performs equation-based rate control using delay. The rate controller 130 calculates the target rate 132 (e.g., performing calculations based on Equation 6) and provides it to the data sources 120. The rate controller 130 also obtains an observed rate 134 indicating the actual bitrate of the network data flow. In some implementations, the rate controller 130 obtains information indicating the observed rate 134 directly from the data sources 120. In some implementations, the rate controller 130 obtains information indicating the observed rate 134 in another manner (e.g., based on a filtered version of the observed bitrate based on acknowledgement packets from the second computing device 150).

In some implementations, the rate controller 130 receives the output data from the data sources 120 and provides the data for sending in the network data flow (e.g., provides the data to a network interface of the first computing device 110). In some implementations, the data sources 120 provide the data directly for sending in the network data flow without going through the rate controller 130. For example, the data sources 120 can provide the data to a network interface (e.g., via a network application programming interface (API)).

Figure 2:
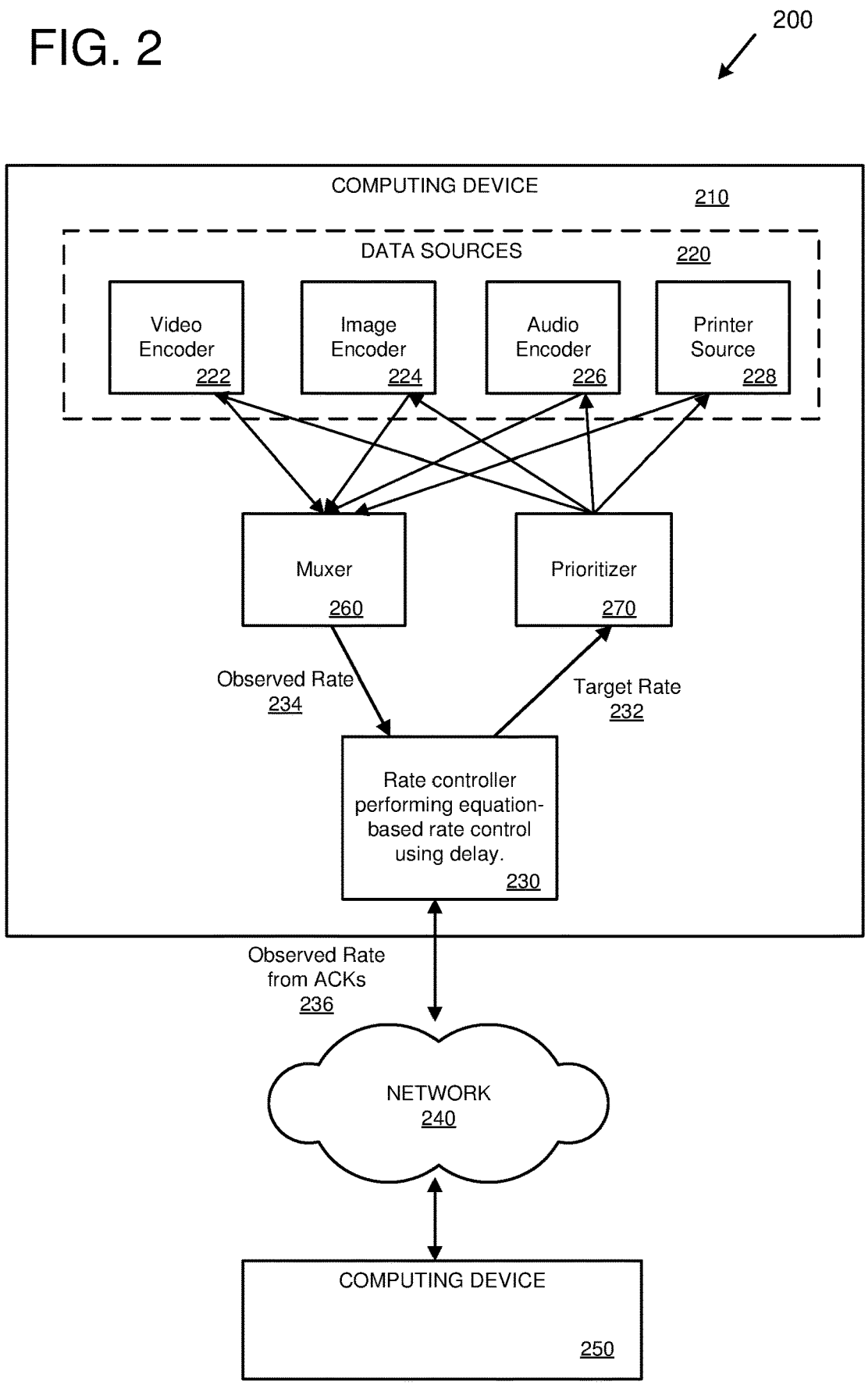
FIG. 2 is a diagram depicting an example environment for performing equation-based rate control using delay for a number of data sources.

FIG. 2 is a diagram depicting an example environment 200 for performing equation-based rate control using delay. In the example environment 200, two computing devices are communicating via a network 240 (e.g., the Internet or another type of packet-switched data network). Specifically, a first computing device 210 is generating a network data flow via one or more data sources for sending to the second computing device 250 via the network 240.

Depicted at the first computing device 210 are four example data sources 220, a video encoder 222, an image encoder 224, an audio encoder 226, and a printer source 228. Depending on the application or service being provided, more data sources, fewer data sources, and/or different data sources may be used.

The data sources 220 output data that for transmission to the second computing device 250 in network packets (e.g., transmission control protocol (TCP) network packets, user datagram protocol (UDP) network packets, and/or network packets sent using another network protocol) via the network 240. The rate that the data sources 220 output data for transmission is controlled by the target rate 232. The target rate 232 sets a target bitrate for the data output by the data sources 220 (e.g., an overall target rate that is shared if there are multiple data sources). However, in some situations the data sources 220 can output data at a rate significantly below the target rate 232. For example, the data output by some applications can vary significantly over time (e.g., with a remote desktop application, the screen content may be static for a period of time resulting in little or no data being transmitted).

In the example environment 200, a rate controller 230 (e.g., implemented in software and/or hardware of the first computing device 210) performs equation-based rate control using delay. The rate controller 230 calculates the target rate 232 (e.g., performing calculations based on Equation 6) and provides it to the data sources 220 via a prioritizer 270. The prioritizer 270 distributes the target rate 232 among one or more data sources (in this example, among the four data sources 220). The prioritizer 270 can be separate from the rate controller 230 (e.g., implemented as a separate software component) or it may be implemented as part of the rate controller 230.

The rate controller 230 also obtains an observed rate 234 indicating the actual bitrate of the network data flow. In some implementations, the rate controller 230 obtains information indicating the observed rate 234 from the data sources 220 via a muxer 260. The muxer 260 can provide information regarding the actual observed rate from the combined data of the data sources 220. In some implementations, the rate controller 230 obtains information indicating the observed rate 234 in another manner (e.g., based on a filtered version of the observed bitrate based on acknowledgement packets (ACKs) from the second computing device 250, as indicated at 236).

In some implementations, the rate controller 230 receives the output data from the data sources 220 (e.g., which is combined by the muxer 260) and provides the data for sending in the network data flow (e.g., provides the data to a network interface of the first computing device 210). In some implementations, the data sources 220 provide the data directly for sending in the network data flow without going through the rate controller 230. For example, the data sources 220 can provide the data to a network interface (e.g., via a network application programming interface (API)).

Methods for Performing Equation-Based Rate Control Using Delay

In the technologies described herein, methods can be provided for performing equation-based rate control using delay. For example, an observed network data rate and a network delay can be obtained for a network communication (e.g., for a remote desktop application). A target network data rate can be calculated using the observed network data rate and the network delay. The target network data rate is calculated using an equation-based approach. For example, the equation-based rate control can set the target network data rate to a value that is directly proportional to the observed network data rate and inversely related to the network delay. In some implementations, Equation 6 is used to calculate the target network data rate. The bitrate for the network communication can then be set to the target network data rate (e.g., by informing data sources of the current target network data rate, which can be updated on a periodic basis).

Figure 3:
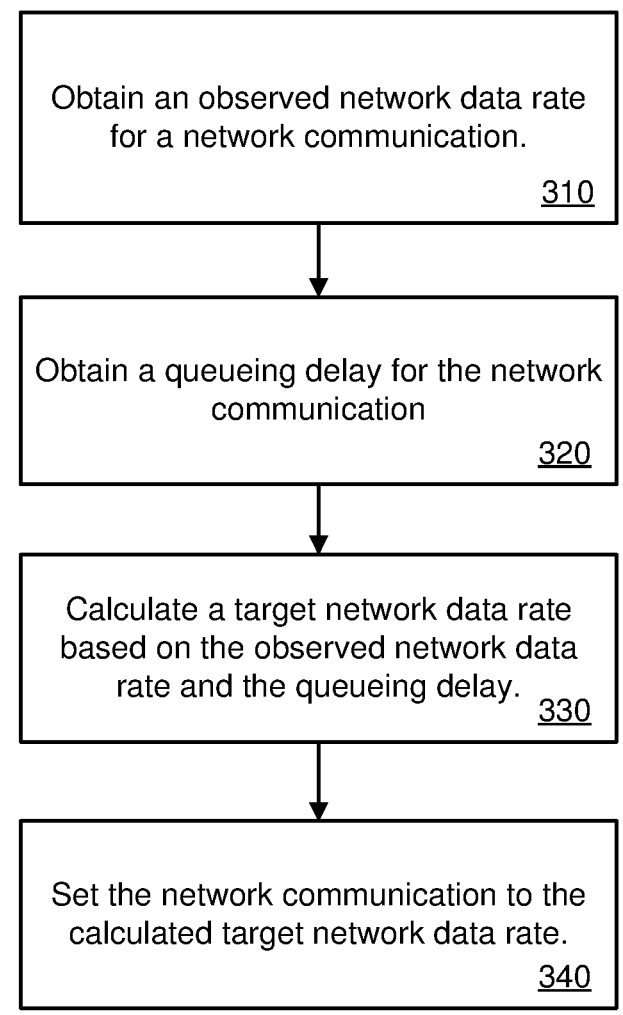
FIG. 3 is a flowchart of an example method for performing equation-based rate control using delay.

FIG. 3 is a flowchart of an example method 300 for performing equation-based rate control using delay. At 310, an observed network data rate is obtained for a network communication. The observed network data rate is an actual bitrate of the network communication (e.g., at a specific instant or averaged over a period of time). In some implementations, the observed network data rate is calculated by averaging received acknowledgement (ACK) packets from the network communication.

At 320, a queueing delay is obtained for the network communication. For example, the queueing delay can be calculated by averaging measured queueing delay for network packets of the network communication.

At 330, a target network data rate is calculated based on the observed network data rate and the queueing delay. The target network data rate increases as the observed network data rate increases, and decreases as the queueing delay increases. In some implementations, the target network data rate is directly proportional to the observed network data rate and inversely related to the queueing delay. In some implementations, the target network data rate is calculated using Equation 6.

At 340, the network communication is set to the calculated target network data rate. For example, the target network data rate can be provided to one or more data sources to use in setting their bitrates. The example method 300 can be repeated on a periodic basis to continually update the target network data rate as conditions change (e.g., changes in observe network data rate, changes in queueing delay, and changes in network conditions).

Figure 4:
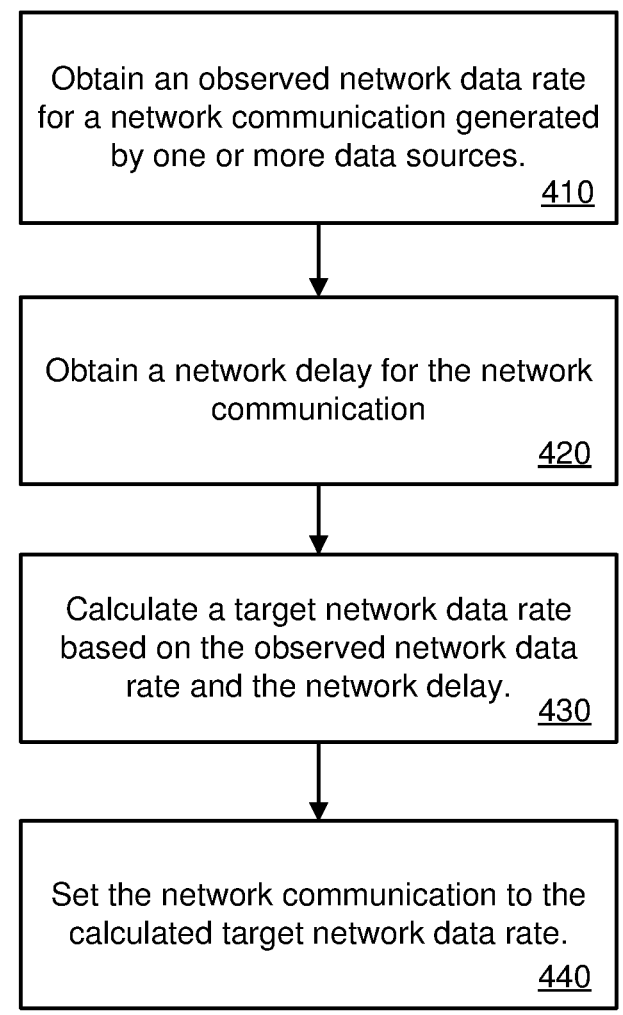
FIG. 4 is a flowchart of an example method for performing equation-based rate control using delay.

FIG. 4 is a flowchart of an example method 400 for performing equation-based rate control using delay. At 410, an observed network data rate is obtained for a network communication generated by one or more data sources. The observed network data rate is an actual bitrate of the network communication (e.g., at a specific instant or averaged over a period of time). In some implementations, the observed network data rate is calculated by averaging received acknowledgement (ACK) packets from the network communication.

At 420, a network delay is obtained for the network communication. For example, the network delay can be calculated by averaging measured network delay (e.g., queueing delay, one-way delay, round-trip-time, or another measure of network delay) for network packets of the network communication.

At 430, a target network data rate is calculated based on the observed network data rate and the network delay. The target network data rate increases as the observed network data rate increases, and decreases as the network delay increases. In some implementations, the target network data rate is directly proportional to the observed network data rate and inversely related to the network delay. In some implementations, the target network data rate is calculated using Equation 6.

At 440, the network communication is set to the calculated target network data rate. For example, the target network data rate can be provided to the one or more data sources to use in setting their bitrates. The example method 400 can be repeated on a periodic basis to continually update the target network data rate as conditions change (e.g., changes in observe network data rate, changes in network delay, and changes in network conditions).

Computing Systems

Figure 5:
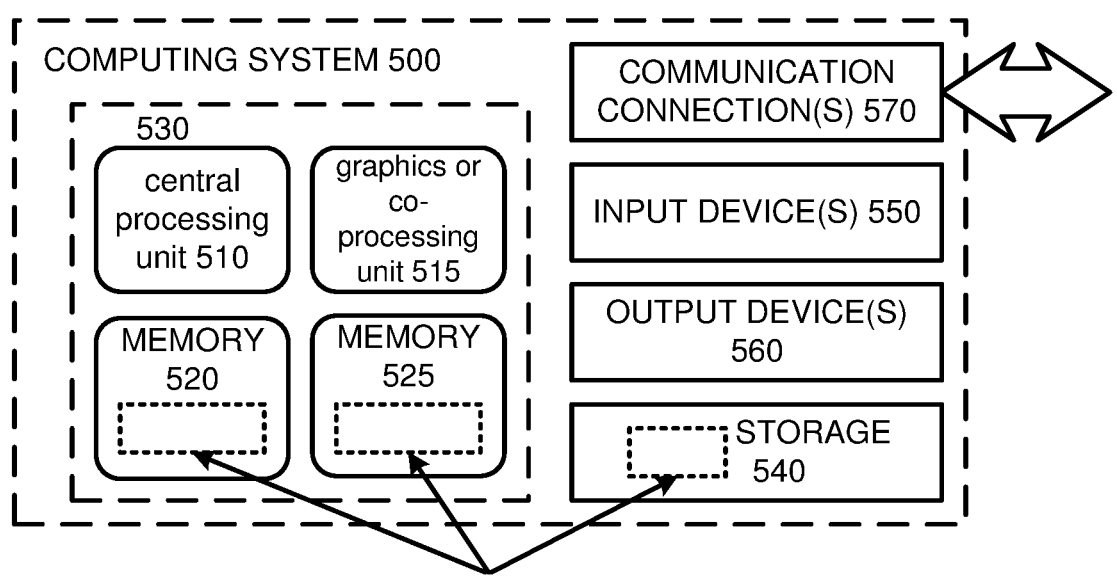
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   one or more data sources running on the computing device based on a current target network data rate; and
   a rate controller performing equation-based rate control using delay for communications over a network, wherein the rate controller is configured to:
      obtain an observed network data rate for a network communication generated by the one or more data sources running on the computing device based on the current target network data rate, wherein the observed network data rate is an actual bitrate observed for the network communication;
      obtain a network delay for the network communication;
      calculate a new target network data rate based on the observed network data rate and the network delay, wherein the observed network data rate is assumed to be less than or equal to the current target network data rate; and
      providing the new target network data rate to the one or more data sources running on the computing device.

2. The computing device of claim 1, wherein the rate controller is configured to:
   receive output data from the one or more data sources; and
   provide the output data to a network interface of the first computing device.

3. The computing device of claim 1, further comprising:
   a prioritizer configured to distribute the new target data rate provided from the rate controller to the one or more data sources.

4. The computing device of claim 1, further comprising:
   a muxer configured to provide information to the rate controller regarding the observed data rate from output data of the one or more data sources.

5. The computing device of claim 1, wherein the network delay for the network communication comprises one-way-delay, queueing delay, or round-trip-time.

6. The computing device of claim 1, wherein the new target network data rate is directly proportional to the observed network data rate and inversely related to the network delay.

7. The computing device of claim 1, wherein the network delay is used as a low-pass filter for the observed network data rate.

8. A method, implemented by a computing device, for equation-based rate control using estimated delay for network communications, the method comprising:
   obtaining an observed network data rate for a network communication generated by one or more data sources running on the computing device based on a current target network data rate, wherein the observed network data rate is an actual bitrate observed for the network communication;
   calculating an estimated network delay for the network communication;
   calculating an updated target network data rate based on the observed network data rate and the estimated network delay, wherein the observed network data rate is assumed to be no more than the current target network data rate; and
   setting the current target network data rate for the network communication to the calculated target network data rate.

9. The method of claim 8, wherein the estimated network delay for the network communication is calculated by:

$$D_{est} = \text{number of bytes in flight}/R_{obRec},$$

where $D_{est}$ is the estimated network delay for the network communication, number of bytes in flight is a number of bytes of the network packets in transit, and $R_{obRec}$ is the actual bit rate.

10. The method of claim 9, wherein the number of bytes of the network packets in transit is at least in part controlled by a window size.

11. The method of claim 8, wherein the estimated network delay for the network communication is calculated by:

$$D_{est} = \text{number of bytes in flight}/(R_{obRec} - RTT_{min}),$$

where $D_{est}$ is the estimated network delay for the network communication, number of bytes in flight is a number of bytes of the network packets in transit, $R_{obRec}$ is the actual bit rate, and $RTT_{min}$ is a round-trip time of a packet.

12. The method of claim 8, wherein setting the setting the current target network data rate for the network communication comprises providing the calculated target network data rate to the one or more data sources running on the computing device.

13. The method of claim 8, wherein the updated target network data rate is calculated directly to a delay-based equilibrium point.

14. The method of claim 8, wherein the estimated network delay for the network communication comprises one-way-delay, queueing delay, or round-trip-time.

15. The method of claim 8, wherein the updated target network rate is calculated on a periodic basis to continually update the current target network data rate as network conditions change.

16. A computer-readable storage medium storing computer-executable instructions for causing a computing device to perform equation-based rate control using delay for network communications, the operations comprising:

obtaining a first observed network data rate for a network communication generated by a first data source running on the computing device based on a current target network data rate wherein the first observed network data rate is an actual bitrate observed for the network communication generated by the first data source;

obtaining a second observed network data rate for a network communication generated by a second data source running on the computing device based on the current target network data rate, wherein the second observed network data rate is an actual bitrate observed for the network communication generated by the second data source;

obtaining a network delay for the network communications of the first and second data sources;

calculating an updated target network data rate based on the first observed network data rate, the second observed network data rate, and the estimated network delay, wherein the observed network data rate is assumed to be no more than the current target network data rate; and setting the current target network data rate for the network communications to the calculated target network data rate.

17. The computer-readable storage medium of claim 16, wherein the first data source and the second data source are configured to implement the current target network data rate to fairly share an available bandwidth of the network.

18. The computer-readable storage medium of claim 16, wherein the network communications of the first data source and the second data source share the same estimated network delay.

19. The computer-readable storage medium of claim 16, wherein the updated target network data rate is shared between the first data source and the second data source.

20. The computer-readable storage medium of claim 16, wherein the network delay for the network communications comprises an estimated network delay.

\* \* \* \* \*